(12) United States Patent
Webster et al.

(10) Patent No.: US 11,374,765 B2
(45) Date of Patent: Jun. 28, 2022

(54) PROCESS FOR MANAGING ESCROW PAYMENTS BETWEEN MULTIPLE PARTIES

(71) Applicants: Cal Wilson Webster, St. Petersburg, FL (US); Joshua Miller, St. Petersburg, FL (US)

(72) Inventors: Cal Wilson Webster, St. Petersburg, FL (US); Joshua Miller, St. Petersburg, FL (US)

(*) Notice: Subject to any disclaimer, the term of this patent is extended or adjusted under 35 U.S.C. 154(b) by 382 days.

(21) Appl. No.: 16/656,785

(22) Filed: Oct. 18, 2019

(65) Prior Publication Data

US 2020/0127843 A1  Apr. 23, 2020

Related U.S. Application Data

(60) Provisional application No. 62/747,281, filed on Oct. 18, 2018.

(51) Int. Cl.
| | |
|---|---|
| *H04L 29/06* | (2006.01) |
| *H04L 9/32* | (2006.01) |
| *H04L 9/06* | (2006.01) |
| *G06Q 20/38* | (2012.01) |
| *G06Q 20/40* | (2012.01) |
| *G06Q 20/34* | (2012.01) |
| *G06Q 10/06* | (2012.01) |

(52) U.S. Cl.
CPC .......... *H04L 9/3239* (2013.01); *G06Q 10/06* (2013.01); *G06Q 20/347* (2013.01); *G06Q 20/3829* (2013.01); *G06Q 20/401* (2013.01); *H04L 9/0637* (2013.01); *H04L 9/3247* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 2019/0065681 | A1* | 2/2019 | Gmeiner | G16H 40/20 |
| 2019/0303623 | A1* | 10/2019 | Reddy | H04L 9/3239 |
| 2019/0377904 | A1* | 12/2019 | Sinha | H04L 9/0637 |

* cited by examiner

*Primary Examiner* — Andrew J Steinle
(74) *Attorney, Agent, or Firm* — Royal W. Craig; Gordon Feinblatt LLC (57) ABSTRACT

A distributed project management system especially suited for construction projects and administered by third party Application Service provider (ASP) in communication with a plurality of remote client computers and providing a dashboard to each party including a general contractor dashboard that facilitates development of a smart contract based on a project template. Each party's dashboard is configured to review, negotiate and accept the project template, whereupon the ASP compiles it into a distributed private blockchain transaction ledger that is updated based on communications from the various dashboards. The ASP determines whether transactions meet a condition of the smart contract, and updates and validates the distributed transaction record ledger. All notices, reports, disbursements, and fund transfers necessary to pay all of the subcontractors and contractor are completed electronically. The process is condensed from months into mere days, it eliminates unreliable verbal notifications, and is impervious to fraud and/or mistake.

17 Claims, 3 Drawing Sheets

PROCESS FOR MANAGING ESCROW PAYMENTS BETWEEN MULTIPLE PARTIES

CROSS-REFERENCE TO RELATED APPLICATION(S)

The present application derived priority from U.S. Provisional Patent Application 62/747,281 filed on Oct. 18, 2018 which is incorporated herein by reference.

BACKGROUND OF THE INVENTION

1. Field of the Invention

The present invention relates generally to computer processes and, in particular, a computer process for managing escrow payments between multiple parties.

2. Description of the Background

Construction and development projects involving contractors and subcontractors typically require extensive documentation and communication in order to distribute payments. For example, a conventional residential construction payment process involves a property owner securing a loan from lender, and hiring a contractor who in turn hires multiple subcontractors. The payment process begins with notice from the general contractor to subcontractors that a draw from the construction loan or the property owner's account will take place. The subcontractors prepare invoices and send them to the general contractor. The general contractor ratifies the invoices, enters the details into an accounting system, and prepares its own invoice along with a declaration that the subcontractors duly performed their services. The invoice and declaration is sent to the lender and property owner, who notify an inspector that an inspection of the property must be performed. The inspector performs the inspection, prepares an inspection report, and sends to the lender and property owner who approve the disbursement, transfer the funds necessary to pay all of the subcontractors and contractor to an escrow account, and cut checks. This process can take months, relies on unreliable verbal notifications, and is inherently susceptible to fraud and/or mistake.

What is needed then is a secure system and computer-implemented method for managing escrow payment between multiple parties.

SUMMARY OF THE INVENTION

One object of the present invention is to provide an innovative system, method and computer program product for managing escrow payments between multiple parties.

Another object is to manage escrow payments between multiple parties by operatively connecting them via block chain distributed network and using the block chain distributed network in conjunction with a smart construction contract.

According to embodiments of the invention, the system includes a plurality of computers or portable devices such as "smart phones" used by each party including contractors, subcontractors, property owner, and lender, and a third party Application Service provider (ASP) providing Software as a Service (SaaS) via one or more back-end application servers configured with ASP software, all connected via a communications network. In an embodiment the ASP also provides a third party escrow service via its application server(s) to the participants via communications network.

The ASP provides a dashboard to each party including a general contractor dashboard that facilitates development of a smart contract, initially by section of a pre-existing template based on the type of job, e.g, Bathroom, Kitchen, Interior Remodel, Whole house remodel, Addition, Addition and remodel, New Home Construction, Condo, Apartment building remodel, New construction for Multi-unit building, New construction for Office building, Restaurant, Retail Build Out, Ground Up Retail, etc. Once a template is selected the contractor dashboard allows customization of the selected template. The final (selected and customized) template organizes each job into working phases, organizes each phase into a series of working milestones for the project, constructs a "To-Do" list for each working phase, and automatically builds the proper payment milestones. A "Payment Milestone" is herein defined as a job milestones with specific to do list items adding up to the total milestone. The Payment Milestone schedule can likewise be customized, except that certain items like building standards, city, state, institution requirements, and lien release type items cannot be removed.

Given the foregoing the general contractor dashboard allows the contractor to assign subcontractors into To-Do list slots where they know where the subs will be used to complete work, or can simply be left blank if the contractor will use its own workers.

Contractors will use the templates to start with a base to start from but then add and remove steps as needed on job site actionable items. The contractor will be able to assign subcontractors into to do list slots where they know where the subs will be used to complete work.

Each party's dashboard is configured to execute computer-readable program code to receive a transaction record associated with the smart contract, the transaction record comprises input data indicating one or more actions taken by each user, and to access a distributed transaction record ledger that is updated based on communications from a block chain distributed network.

Each time the contractor or a subcontractor completes a To-Do list item, they will enter details and pricing, and the ASP uses smart contract logic associated with the smart contract, determines whether the indicated one or more actions meets a condition of the smart contract, and updates and validates the distributed transaction record ledger.

The various participant dashboards update the distributed transaction record ledger directly, and provide a collaboration platform by which the ASP can generates and issue invoices, maintain and display an accounting system, solicit declarations that the subcontractors duly performed their services, etc. Invoices and declarations are electronically transmitted to the lender and property owner, notice is electronically transmitted to an inspector that an inspection of the property must be performed, and solicits the inspection report. All notices, reports, disbursements, and fund transfers necessary to pay all of the subcontractors and contractor are completed electronically. The process is condensed from months into mere days, it eliminates unreliable verbal notifications, and is impervious to fraud and/or mistake.

The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

Figure 1:
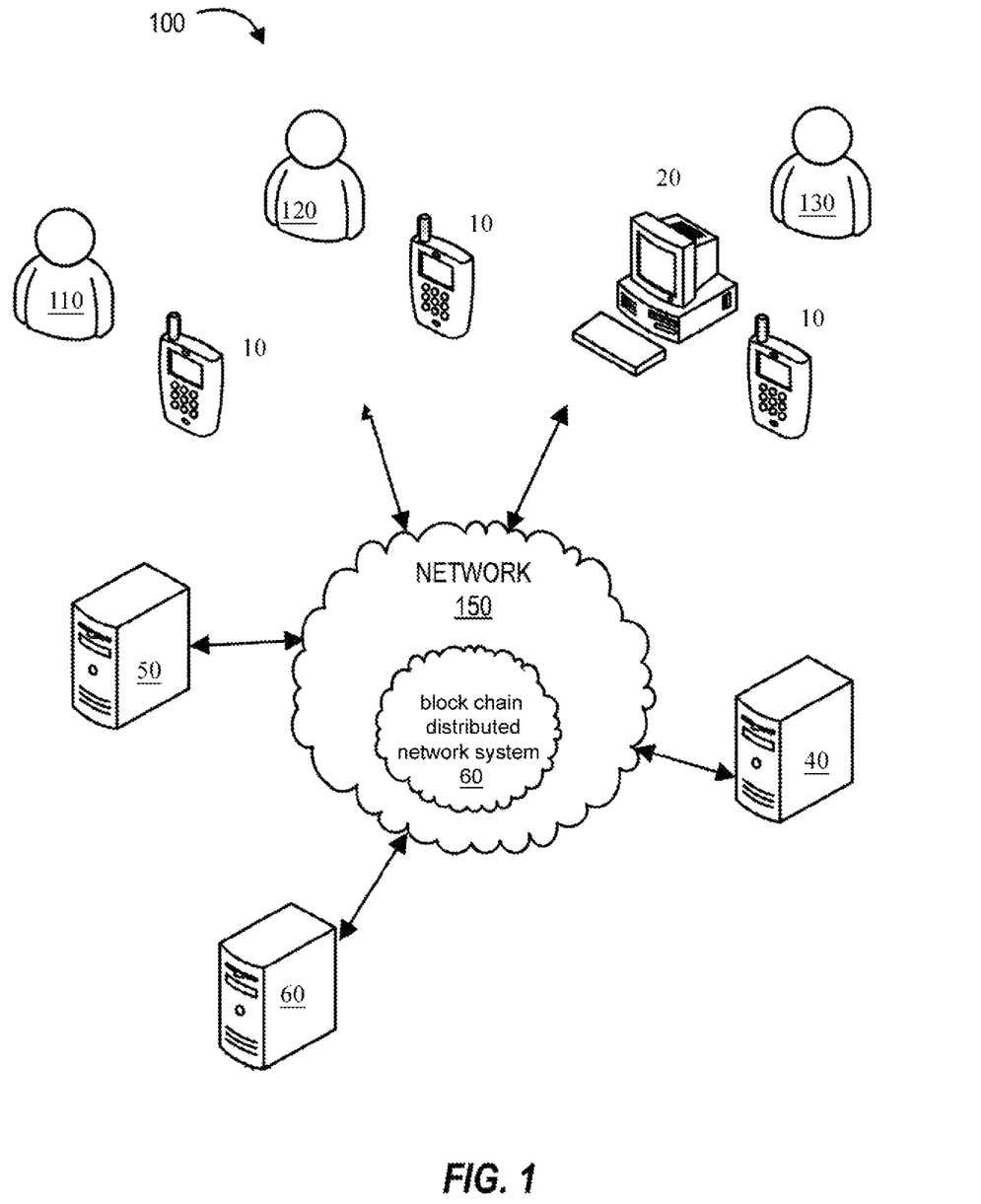
FIG. 1 is a block diagram illustrating a distributed network system and architecture suitable for implementing the computer-implemented method for managing escrow payment between multiple parties, in accordance with embodiments of the invention.

As illustrated in FIG. 1, system 100 participants include a contractor 110 and one or more subcontractors 120, all providers of services to a property owner 130. One skilled in the art should understand that each user 110-130 may be a person, business or other entity.

Contractor 110, subcontractor(s) 120 and property owner 130 may each access the system 100 via a mobile device 10 and/or a personal computing device 20. The personal computing device 20 may be any device that employs a processor and memory and can perform computing functions, such as a personal computer or a mobile device.

The mobile devices 10 and the personal computing devices 20 are configured to communicate over a network 150 with a lender system 40, a back-end application service provider (ASP) system 50, and a private blockchain represented by the block chain distributed network system 60.

As used herein, a "mobile device" 10 is any smart mobile communication device, such as a cellular telecommunications device (i.e., a cell phone or mobile phone), personal digital assistant (PDA), a mobile Internet accessing device, or other mobile device.

The term "blockchain" refers to a distributed ledger that records peer to peer digital transactions. A blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

The term "private blockchain" refers to a blockchain in which direct access to blockchain data and transactions is permission-based, network 60 being a permissioned network with restrictions on who is allowed to participate in the network and in what transactions.

In the present system the permissions hierarchy of private blockchain network 60 is managed by ASP 50 and access is limited to Contractor 110, subcontractor(s) 120, property owner 130, lender system 40, back-end application service provider (ASP) system 50, and any other preauthorized entities.

The ASP 50 provides Software as a Service (SaaS) via communications network 150. In an embodiment the ASP also provides a third party escrow service via its application server(s) 50 to the participants via communications network 150.

The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network.

Smart contracts are computer processes that facilitate, verify and/or enforce negotiation and/or performance of a contract between parties. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others. As used herein the term "smart contract" refers to pre-written logic (computer code) stored on a distributed storage platform that defines a sequence of rule-based "if/then" transactions, executed/run by a network of computers, and in communication with a blockchain to provide ledger updates.

The term "public key" refers to a cryptographic key used with a public key cryptographic algorithm that is uniquely associated with a known entity and that may be made public.

The term "private key" refers to a cryptographic key, used with a public key cryptographic algorithm that is uniquely associated with one of Contractor 110, subcontractor(s) 120, property owner 130, lender system 40, back-end application service provider (ASP) system 50, or other preauthorized entity.

The term "multisignature" refers to a digital signature scheme that allows a group of users to sign a single document.

Disclosed herein is a system and method for blockchain-based smart contract driven construction management. The approaches disclosed herein allow users to: (1) collaborate on a common computer platform to build a unified smart contract for a construction project; (2) create a blockchain ledger of transactions taken pursuant the smart contract; (3) manage and automate escrow funding during completion of the smart contract.

The mobile devices 10 and personal computing devices 20 are configured with software providing a user-interface dashboard specific to each party, including a general contractor dashboard, subcontractor dashboard, property owner dashboard and lender dashboard. A property inspector dashboard may also be provided. Similarly, the mobile devices 10 are configured with application software providing a dashboard specific to each party. The respective dashboards facilitates development of a smart contract as will be described. The dashboards for mobile devices 10 may be mobile applications, and for computers 20 may be implemented as standalone software programs, or a server-side program resident on ASP server 50 with a thin-client front end on computers 20.

All the dashboards for mobile devices 10 and computers 20 intercommunicate via network 150 and thereby provide a collaboration platform, and all the dashboards for mobile devices 10 and computers 20 intercommunicate via network 150 with the block chain distributed network system 60 (i.e., "block chain system 60).

Each user has is assigned login credentials by ASP 50 and in order to access the respective user account(s) must authenticate with the ASP 50. Similarly, in some embodiments, in order to access the distributed ledger(s) of the block chain systems 60 a user must authenticate with the block chain systems 60. For example, logging in generally requires that the user 110-130 authenticate his/her identity using a user name, a passcode, a cookie, a biometric identifier, a private key, a token, and/or another authentication mechanism that is provided by the user 110-130 via their mobile device 10 or computer 20.

Permissions-based access to the block chain system 60 is configured, controlled and managed by ASP 50 over the network 150.

The general contractor dashboard includes several sequential screens for implementing the present workflow to facilitate development and execution of a smart contract, initially by section of a pre-existing template based on the type of job. Each template identifies the key variables of a construction contract, including quality standards, performance mileposts, payment schedule and optional terms. The blockchain network 60 provides a collaboration platform by which the originated contract can be negotiated, finalized, and signed electronically all by user input.

More specifically, the final (selected and customized) project template organizes each job into working phases, organizes each phase into a series of working milestones for the project, constructs a "To-Do" list for each working phase, and automatically builds the proper Payment Milestones. The general contractor dashboard then allows the contractor to assign subcontractors into To-Do list slots where they know where the subs will be used to complete work, or can simply be left blank if the contractor will use its own workers. One non-limiting example of a platform for developing and deploying smart contracts on the blockchain is the Ethereum Virtual Machine (EVM), a known runtime environment for smart contracts in Ethereum. The smart contract code itself may be authored using any suitable high-level authoring language (Solidity, LLL, Vyper, etc.), and each dashboard includes a smart contract GUI for smart contract compilation, linking, deployment and binary management, and which displays transaction history. Smart contract functions happen through user interactions with their dashboard GUIs, which interact with the ledger on the blockchain network 60 to record transactions therein. In an embodiment the ASP 50 manages the dashboards, solicits input, and manipulates the blockchain ledger 60 using Web3.js, a collection of Java code libraries which allow interaction with the blockchain ledger 60 over network 150 (by HTTP or IPC connection). In one implementation, the smart contract may be an Ethereum smart contract written using Solidity programming language utilizing Web3.js Ethereum JavaScript API to communicate with the blockchain (e.g., to provide push notifications to the dashboards based on blockchain activity). A library of smart contract templates may be generated using established developer tools. For example, OpenLaw™ is a blockchain-based protocol for the creation and execution of legal agreements that provides both legal templates and a legal markup language for customization. Given a finalized project template its payload is executed in the Ethereum virtual machine, and the shared blockchain ledger 60 is updated accordingly with each transaction. Thus, ledger 60 is essentially a transaction record associated with the smart contract. All other documents and content associated with the smart contract are stored at ASP 50. The transaction record ledger comprises input data indicating one or more actions taken by each user, and the distributed transaction record ledger is updated based on communications through/from network 150. Thus, each time the general contractor or a subcontractor completes a To-Do list item, they enter that along with other salient details and pricing, and the ASP 50 uses smart contract logic associated with the smart contract, determines whether the indicated one or more actions meets a condition of the smart contract, and updates and validates the distributed transaction record ledger.

The ASP 50 can also generate and issue invoices by updating the distributed transaction record ledger, maintain and display an accounting system, solicit declarations that the subcontractors duly performed their services, etc. All documents including invoices and declarations are electronically transmitted to the lender and property owner, all notices are electronically transmitted, and all reports, disbursements, and fund transfers necessary to pay all of the subcontractors and contractor are completed electronically. The process is condensed from months into mere days, it eliminates unreliable verbal notifications, and is impervious to fraud and/or mistake.

Figure 2:
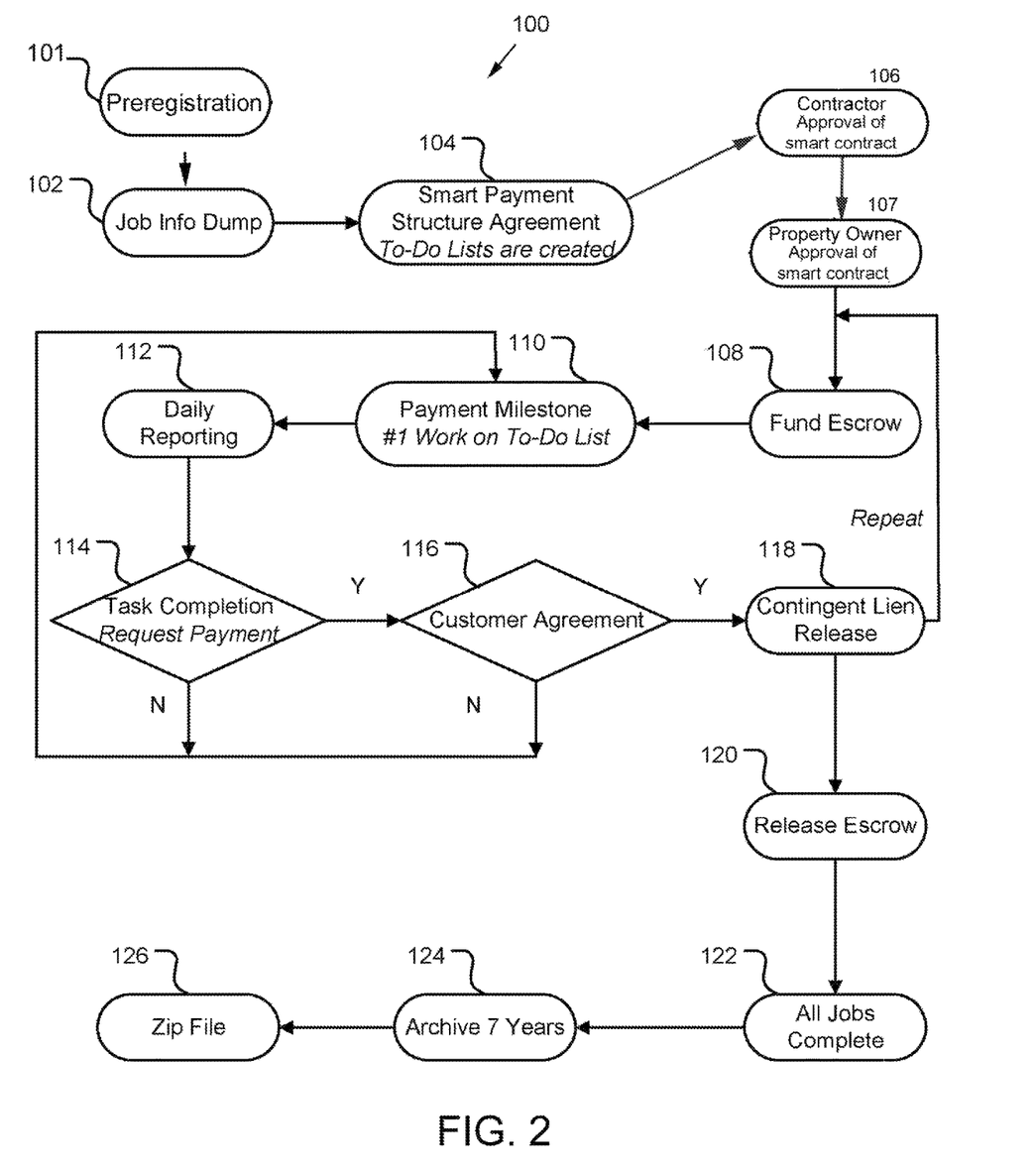
FIG. 2 is a process diagram illustrating the stepwise sequence of example operations for using distributed ledger according to an embodiment of the invention.

FIG. 2 is a more detailed flow diagram showing the present workflow.

At step 101 all parties pre-register with ASP 50 and creates profiles by entering business and contact information. Information collected at this point includes contact info (addresses, emails, phones, etc.) driver licenses, connect via Facebook, licensing information for lien release approvals, phone numbers, etc. Contractors may upload copies of their relevant business and occupational licenses for verification and credibility, and a driver's license for lien release approvals. Contractor 110 and subcontractor(s) 120 may enter fixed costing information such as personnel labor costs. All this information is retained from initial sign up for one year, but contractors are required to update their information every year and can set reminders on when to renew workers comp and general liability insurance. For security, all device IP addresses are also recorded for an additional layer of verification. After data entry, phones 10 are connected by SMS Verification: an automated text is be sent to the user's phone. The text contains a one-time code that they will input on their profile to verify that they own their phone number. Given pre-registration above the system allows contractor 110, subcontractor(s) 120 and property owner 130 to link their bank accounts through a confirmation system for online payments and money transfers. Participants enter bank name, bank location, ABA routing number and account numbers. The contractor 110 may also designate a third party financing institution to pre-register, so that they too can connect their business accounts, sign in and fund projects.

Project entry 102 begins with contractor 110 picking the type of job from discrete selections: Bathroom, Kitchen, Interior Remodel, Whole house remodel, Addition, Addition and remodel, New Home Construction, Condo, Apartment building remodel, New construction for Multi-unit building, New construction for Office building, Restaurant, Retail Build Out, Ground Up Retail. The job selection user interface includes drop-down lists with associated videos describing each job. Initial job selection prompts the job selection user interface to ask questions quantifying the job scope of work. The information populates a project master record. The project entry user interface then presents a project estimator module which allows the general contractor to input specific time and materials data, unit pricing, square footages, etc., and any other costing information not known from the profile entered at step 101. Based on the cumulative project information the project entry user interface suggests project templates containing a project workflow schedule, payment schedule, proper disclosures, and specific disclaimers for the project. The project template also includes a contract document reflecting the foregoing. The contractor 110 also has the option to upload work permits for subcontractors and employees.

In an embodiment the project entry user interface allows the general contractor to assign specific subcontractors into to do list slots where they know where the subs will be used to complete work (or can be left blank if they have in-house workers).

At step 104 the project template is assembled by the project estimator module at ASP 50 by compiling all necessary statement of work records ("SOW records") including workflow, time and materials data, unit pricing, square footages, etc., input above in step 102 and at step 101. All SOW records are associated with each other and relationships are defined between associated SOWs; creating SOW budget records, relating the SOW budget records into budget master records; associating the budget master records to the project, creating contract records, and ultimately assembling all the foregoing records into a Smart Contract maintained at ASP 50. In an embodiment the project estimator module at ASP 50 may break the overall master template down into discrete tasks linked by association into the overall project (e.g., a "To-Do list"), each To-Do list represented by a slave template reflecting a discrete statement of work (SOW) record that guides the contractor to build the proper job and payment milestones. The master project record associates all slave SOW records and defines milestones and relationships there between, and then associates all slave SOW records to a defined budget with payment milestones, and associates slave SOW budget records into budget master records.

Payment Milestones include actionable task items plus completion percentages. For example: a task item "demolish an existing floor" may include a To-Do punch list and payment milestones of 50% upfront, 25% on 50% completion, and 25% on 100% completion.

Building standards are illustrated as needed. For example, level of finishes will be determined via a video description of each level of finish. This sets the expectations for the property owner and contractor to work from. This will also help set a price point when the contractor is creating the contract. This is an important feature because the third party inspector or arbitrator will know what level to look for when determining who is in the right or wrong. All To-Do list items are detailed and attainable, and each item/milestone is worth a defined dollar amount. The foregoing structure is designed to help all participants mentally digest each actionable step.

Following Smart Contract assemblage all master and slave records may be edited and customized by the general contractor using their dashboard. Thus, contractors will generally use the template to start but may add or remove steps as needed on job site actionable items. Importantly, certain unalienable items at least including building standards, city, state, institution requirement, and lien release type items are not be able to be edited or removed. This is also where the contractor can tailor the estimated payment schedule to fit his custom job details. Each master/slave template includes predetermined "Payment Milestones" each including task item, progress indicator and payment amount, as well as estimated dates for the contractor to edit and present to the subcontractors and Property Owner for approval and discussion. In each instance a video description assists the Property Owner to know what to expect in hope to improve their negotiations on when things should be done and how much each milestone should generally cost.

At step 106 after the contractor has finally completed the entire project Smart Contract with milestones set and To-Do list items completed, they accept the result and the ASP 50 generates an invitation message to the Property Owner dashboard to review the actionable scope of work and payment milestones. The Property Owner can suggest changes and/or make notes on items which are transmitted back to the contractor 110. The contractor 110 may add or remove steps as needed, modify parameters, change terms, and re-present the Smart Contract to the Property Owner for approval. Some pre-existing templates are available to help resolve contractor and Property Owner concerns, for example: tight timeframe waivers; Property Owners belongings on the job site waiver; rainy season/extreme weather waiver, and other waivers and last minute agreements.

At step 107 after the contractor and Property Owner have finally approved the entire project Smart Contract with milestones set and To-Do list items completed, they accept the result and the ASP 50 generates an invitation message to the Lender system 40 dashboard to review the actionable scope of work and payment milestones. The Lender 40 can suggest changes and/or make notes on items which are transmitted back to the contractor 110. Again the contractor 110 may add or remove steps as needed, modify parameters, change terms, and re-present the Smart Contract to the Property Owner for approval, and then again to the Lender.

Eventually, the final Smart Contract is presented to all parties and signed via the platform 150. Any of a variety of existing eSignature providers may be used for this purpose including PandaDoc™, DocuSign™, Adobe Sign™ or the like.

Once the Smart Contract is fully approved, its executory components are saved as variables in the private blockchain ledger 60 and distributed to all parties for implementation in an efficient, verifiable and permanent manner. The ASP 50 relies on the private blockchain ledger 60 to manage cross-organization workflow.

At step 108 an escrow account is funded by Lender 40 at ASP 50, which maintains the account and serves as escrow agent. The money is electronically transferred from third party Lender 40 into an ASP 50 account who will then hold the escrow until the milestone To Do lists are complete. The ASP 50 as escrow agent is legally responsible to hold and distribute all funds and manage the transaction.

As an alternative to escrow, the ASP 50 may act as intermediary to a bank where financing is unnecessary. In this instance the ASP server 50 is connected to both the blockchain network and Property Owner's bank, preferably providing direct authenticated access to the bank by giving them an application programming interface (API). The bank is also a blockchain participant with its own account (public/private key pair) on the blockchain. The ASP 50 receives a payment instruction from the blockchain smart contract, contacts the bank via API, and mediates the funds transfer. A confirmation is provided by the bank and persisted in the Smart Contract on the blockchain as a proof of payment. In order to provide a stronger proof of authenticity, the bank API will include a response (or data items in the response) signed by bank including details of the recipient bank account and payment amount, so that these can be stored in the smart contract on the blockchain and validated at a later date, either by the logic encapsulated in the smart contract or by logic implemented off-chain. It must also be possible to validate that the payment confirmation originated from the bank and that the payment was executed as specified by the smart contract. This is achieved by storing and validating the bank server certificate and signed response. Bank and payment confirmation is entered into the Smart Contract on the blockchain directly by the Bank using their blockchain account. As with any data entered into the smart contract, this proof of fiat payment is entered into the blockchain through a transaction call to the Smart Contract. The proof of payment is stored in the smart contract ledger.

All subsequent execution and completion of the project is tracked on the private blockchain, and the Smart Contract is automatically settled with corresponding progress payments for each Payment Milestone based on pre-determined task item, progress indicator and payment amount. A reliable, immutable, shared record of all transaction activity is recorded on the distributed private blockchain ledger so that an accurate view of the smart contract transaction activity may be tracked. Every time that smart contract transaction activity is recorded on the blockchain it is distributed to all blockchain nodes. The present invention represents a shared workflow for completing the blockchain smart contract. Each party's dashboard is configured to execute computer-readable program code to append transaction items to the ledger associated with the smart contract, the transaction record comprises input data indicating one or more actions taken by each user, and to access a distributed transaction record ledger that is updated based on communications from a block chain distributed network. For example, each time the contractor or a subcontractor completes a To-Do list item, they will enter details and pricing, and the ASP uses smart contract logic associated with the smart contract, determines whether the indicated one or more actions meets a condition of the smart contract, and updates and validates the distributed transaction record ledger. The various participant dashboards update the distributed transaction record ledger directly, and provide a collaboration platform by which the ASP 50 can generates and issue invoices, maintain and display an accounting system, solicit declarations that the subcontractors duly performed their services, etc. Invoices and declarations are electronically transmitted to the lender and property owner, notice is electronically transmitted to an inspector that an inspection of the property must be performed, and solicits the inspection report. All notices, reports, disbursements, and fund transfers necessary to pay all of the subcontractors and contractor are completed electronically. The process is condensed from months into mere days, it eliminates unreliable verbal notifications, and is impervious to fraud and/or mistake.

Specifically, at step 110 ASP 50 monitors the smart contract ledger for each payment milestone and holds everyone accountable on day-to-day action items in the scope of work. Contractors and subcontractors work together to complete these actionable To Do list items. The respective dashboards increase transparency because workers see actionable items with associated prices so they know exactly what they are getting paid to do. The system 100 as a whole forces transparency and cooperation because of the monetary restrictions if no interaction takes place. In one implementation, the following occurs at step 110. The contractor 10 and subcontractors 20 see their milestones and actionable to-do lists to complete the milestone. The list is designed to make sure all the proper steps are being taken care of. They complete Milestone #1 and report.

At step 112 daily reporting is administered via an interactive text message system that all participants will be able to identify what they have complete. For example:

The contractor will receive a text saying what did you get done today? Click the corresponding number with completed to do list items: 1—install shower wall tile. 2—Install bathroom floor tile. 3—Install shower niche. 4—Order Grout 5—Grout Tile. 6—Pick out granite. 7—schedule the glass enclosure meeting. The contractor will click the corresponding numbers on task completed.

Then the contractor will receive a follow up text for the completed items: "Line item 1 was completed. Please take photo for line item #1 and give an additional description." This photo will be time and geo stamped to make sure the photo and time are properly recorded to prevent fraudulent photos. Then it will continue the same questionnaire on another additional completed items. Once completed: a follow up text will ask for "any note or change orders to be noted? If YES, call this number for voice recording. If NO, text NO."

If no, the final text will come through and ask for a general update on job time frame and reasons for the change of time frame.

Upon completion of the contractor daily reporting. The Property Owner will receive an invite text to visit the general daily log ledger to see what was completed and notes from the contractor. The will be notified in the notifications tab of any schedule time changes and change orders. The Property Owner will then have the right decline or accept the changes or decline them.

When the workers are completing their daily reports via the text messaging system the technology will be asking for daily photos of work performed. Time and geolocation stamps are connected to each photo or it will be rejected until a proper picture is taken. These rejected photos will be notification to the Property Owner to be extra diligent about approving the photo with actually eyes on the project and what they were being approved for. The system will request the contractor is there were any issues or there will be a place for the contractor to report and issue and send the issue to the Property Owner for notice and potential change order.

A contractor can add to do list items as the project moves along and change orders are created. Change orders create new milestones and will be work on separate from the existing schedule milestones. There is a preset "no action" acceptance period that will auto approve the change order and/or schedule change. Several text messages and on site notifications will be sent leading up to the "No action acceptance."

At step 114 the ASP 50 monitors completion of tasks and generates payment requests in response to determining that the task is completed. The monitoring operation may include one of the following:

The contractor will mark the to-do list as tasks are completed

These completed tasks will require geotagged pictures of the completed task.

Any city inspections and city documents will need to be uploaded to the system. The city inspections will be approved via however the city inspectors do it. But we will teach the client how to see they are completed. These completed tasks are then sent to the Property Owner for approval.

At step 116 a Property Owner reviews each completed task, reviews relevant photographs, and either accepts or rejects that the task has been completed successfully in accordance with the following sequence:

Upon accepting the process will move to the automated contingent lien release step 118;

Upon denial the task will be sent back to the contractor at step 106 for review.

Step 118 provides one or more functions to implement a contingent lien release. In one implementation, one or more of the following tasks may be performed by the operation 118.

This system 100 will allow for the incremental release of funds as the tasks are completed.

The contractor/subcontractor will be releasing their right to sue the Property Owner for the dollar amount of the specific task, as they have already been paid for this.

Once the contractor/subcontractor accepts the contingent lien release the ASP 50 is notified and releases those specific funds by an automated process.

Step 120 provides one or more functions to release the escrow. This releasing of funds is another important place where blockchain is essential because it makes proper payments to contractors, subs and workers directly, and the contractor cannot hold back funds of their own accord. One or more of the following tasks may be performed at step 120.

a. Disbursement of funds—in prioritized order
b. Pay cash advances/Proof payments/credit card.
c. Pay suppliers for any outstanding monies owed.
d. Pay subs directly—bypassing the contractor's bank account.

Remaining funds will be transferred directly into contractor account (profit split and remaining reimbursement costs)

An operation 122 determines that all jobs are complete and, if complete, a curation operation is implemented. All involved parties will be asked to rate each other on various elements of the job. Specifically, one or more of the following tasks may be performed by the operation 122.

a. Contractor success rating system for potential Property Owner to see. At the end of each job system 100 takes Property Owner comments, completion times, on budget at the completion of the job, and communication matrix to help Property Owner see actual stats on a contractor's success. This will note be based off of opinions. Also, Property Owner comments will be held for future Property Owner to read through.
b. Property Owner rating system for contractors to see. This is a platform for contractors to express their experience when dealing with a Property Owner. Comments along the lines of ease of communication, ease of decision making, and if there was sabotage to their ability to get the job done. This is designed to warn contractors of what they could be getting into with a Property Owner.

Next an operation is implemented at step 124. Operation 124 allows the user to archive the documents for a predetermined time period, such as for example, seven years from the creation of the documents and an operation 126 allows the user to generate a zip file of the documents.

Figure 3:
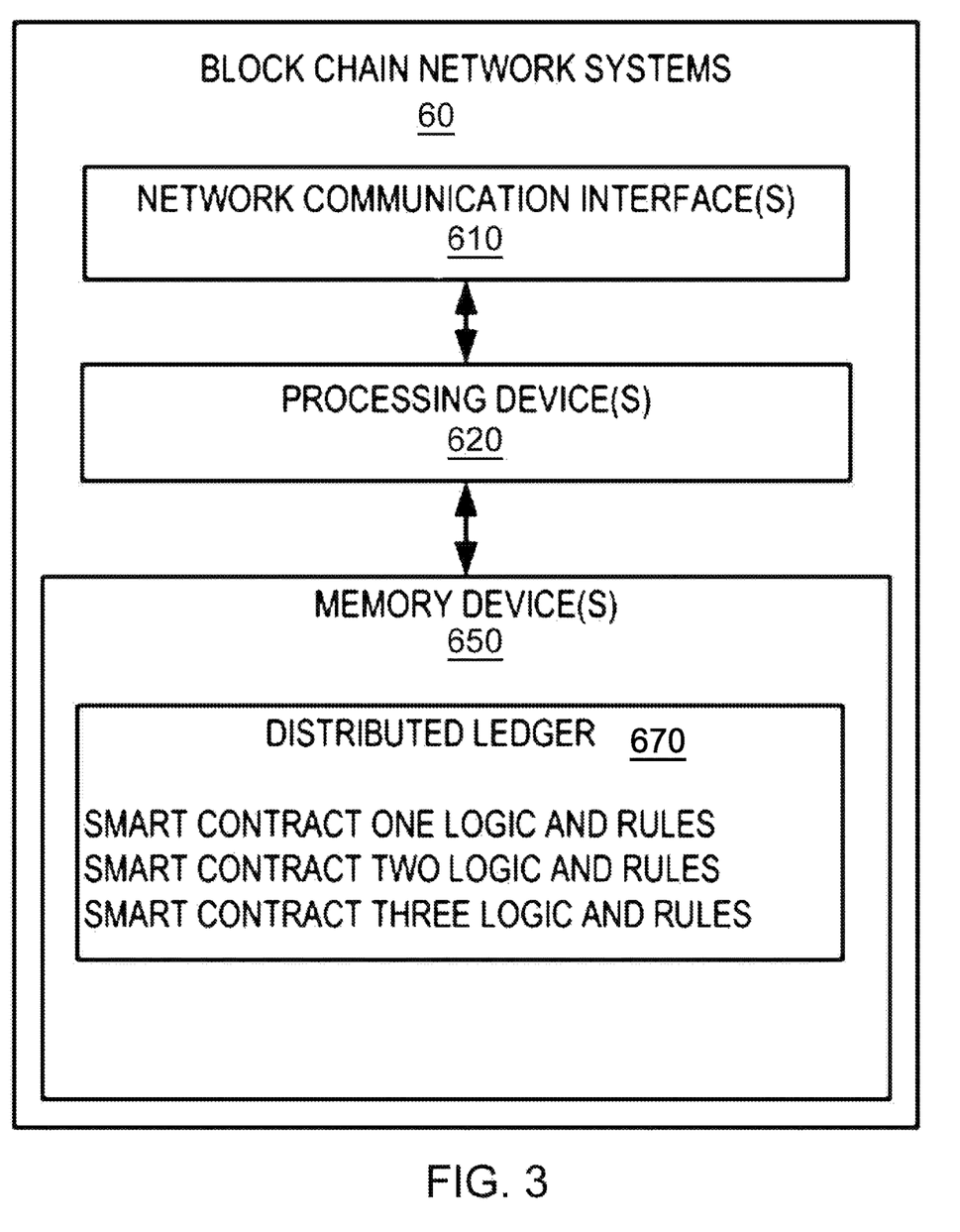
FIG. 3 is a block diagram illustrating a blockchain architecture 60 for managing escrow payment between multiple parties using one or more nodes on a distributed ledger, according to the invention.

It should be apparent that the foregoing workflow implemented by the decentralized private block chain configuration or architecture as per FIG. 3, and utilizing centralized management and a database at ASP 50, facilitates the above-described smart contracts and maintenance of an accurate ledger of smart contracts and transactions to provide validation of transactions involving those smart contracts.

In various embodiments of the invention, a smart contract block chain configuration is used to implement a secure and transparent ASP 50 managed Smart Contract. Generally, each Smart Contract is established as a container for To Do list task items and payments payable from Property Owner to participants. Each action is processed using the public key held by the Property Owner in order to verify the authenticity of the Property Owner's action(s), and the resulting encrypted action information is input into the smart contract. The smart contract, using embedded logic (i.e., rules-based logic) can decrypt the encrypted action information and determine if it validates payment based on the terms of the smart contract. If so, the smart contract enables delivery of the specified payment to the specified participant. In various embodiments, all activity and payouts are visible on the block chain network for full transparency into the smart contract and its use.

As illustrated in FIG. 3, the block chain distributed network system 60 generally includes, but is not limited to, a network communication interface 610, a processing device 620, and a memory device 650. The processing device 620 is operatively coupled to the network communication interface 610 and the memory device 650. In one embodiment of the block chain network systems 60, the memory device 650 stores a distributed ledger 670. The distributed ledger 670 stores smart contract logic and rules, such as a first smart contract, its associated logic and rules, a second smart contract, its associated logic and rules, a third smart contract, its associated logic and rules, etc. The distributed ledger 670 instructs the processing device 620 to operate the network communication interface 610 to perform certain communication functions involving the distributed ledger 670 and to perform Smart Contract logic, data processing, and data storing functions of the application associated with the distributed ledger 570 described herein.

The network communication interface 610 is a communication interface having one or more communication devices configured to communicate with one or more other devices on the network 60. The processing device 620 is configured to use the network communication interface 610 to receive information from and/or provide information and commands to a mobile device 10, a personal computing device 20, servers 40, 50, 60, and/or other devices via the network 150. In some embodiments, the processing device 620 also uses the network communication interface 610 to access other devices on the network 150, such as one or more web servers of one or more third-party data providers. In some embodiments, one or more of the devices described herein may be operated by a second entity so that the second entity controls the various functions involving the block chain network systems 60.

As described above, the processing device 620 is configured to use the network communication interface 610 to gather data, such as data corresponding to transactions or other updates to the distributed ledger 670 from various data sources such as other block chain network systems 60. The processing device 620 stores the data that it receives in its copy of the distributed ledger 670 stored in the memory device 650.

Each participant in the transaction workflow of a particular smart contract uses its blockchain account (public/private key pair) to approve, sign, track, and settle the smart contract, as appropriate. Each party involved in cross-organization workflow will be associated with a blockchain account. For example, in an invoice use case, each party has a blockchain account/key. The blockchain is permissions based, e.g., only approved parties will be able to access specific contracts. A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere. The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "participants" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, meets other criteria.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A distributed project management system, comprising:
  a host computer in communication with a plurality of remote client computers via at least one communications network, said host computer including a processor and non-transitory storage media;
  a database resident on the non-transitory storage media, said database comprising a plurality of user profiles each including user contact information and authorized user device IP addresses;
  a plurality of user dashboards each operable on an authorized user device and including a first user dashboard configured to execute computer-readable program code to perform the steps of,
    allowing a first user to input project specifications including a scope of work including estimated time and materials,
    allowing said first user to select a project template comprising actionable task items for completion of said scope of work and payment milestones,
    allowing said first user to edit said project template to customize task items and payment milestones;
  said host computer further including a plurality of software modules including,
    a project estimator module comprising computer-readable program code configured to compile the edited project template into a smart contract;
    a project compiler comprising computer-readable program code configured to compile the smart contract into a private blockchain ledger associated with the smart contract, and
    a project management module comprising computer-readable program code configured to update said private blockchain ledger based on inputs to said first user interface and to provide notifications to said plurality of remote client computers, and
    a project payment module comprising computer-readable program code configured to automatically transfer payment from an escrow account upon completion of a payment milestone.

2. The distributed project management system according to claim 1, wherein said project template further comprises a project schedule and payment schedule, and a contract document reflecting said a project schedule and payment schedule.

3. The distributed project management system according to claim 2, wherein said project template comprises a master template and a plurality of slave template linked by association to the master template.

4. The distributed project management system according to claim 1, wherein said first user interface comprises a contractor dashboard.

5. The distributed project management system according to claim 4, further comprising a subcontractor dashboard.

6. The distributed project management system according to claim 4, wherein said contractor dashboard is configured to execute computer-readable program code to perform the steps of allowing a contractor to assign subcontractors to task items.

7. The distributed project management system according to claim 5, further comprising a property owner dashboard.

8. The distributed project management system according to claim 7, further comprising a lender dashboard.

9. The distributed project management system according to claim 1, wherein said project template comprises actionable task items and partial payment milestones.

10. A distributed construction project management system, comprising:
  a host computer in communication with a plurality of remote client computers via at least one communications network, said host computer including a processor and non-transitory storage media, and a database resident on the non-transitory storage media, said database comprising a plurality of user profiles each including user contact information and authorized user device IP addresses;
  a plurality of user dashboards each operable on an authorized user device and presenting a user interface, said plurality of user dashboards including,
    a contractor dashboard configured to execute computer-readable program code to perform the steps of,
      allowing a contractor to input project specifications including a scope of work including estimated time and materials,
      allowing said contractor to select a project template comprising actionable task items for completion of said scope of work and payment milestones,
      allowing said contractor to edit said project template to customize task items and payment milestones;

said host computer further including a software configured to execute computer-readable program code to perform the steps of,
    compiling the edited project template into a smart contract,
    compiling the smart contract into a private blockchain ledger associated with the smart contract, and
    updating said private blockchain ledger based on inputs to said contractor dashboard, and
    automatically transferring payment from an escrow account upon completion of a payment milestone.

11. The distributed project management system according to claim 10, wherein said project template further comprises a project schedule and payment schedule, and a contract document reflecting said a project schedule and payment schedule.

12. The distributed project management system according to claim 10, wherein said plurality of user dashboards further comprise a subcontractor dashboard.

13. The distributed project management system according to claim 12, wherein said plurality of user dashboards further comprise a property owner dashboard.

14. The distributed project management system according to claim 12, wherein said contractor dashboard is configured to execute computer-readable program code to perform the steps of allowing a contractor to assign subcontractors to task items.

15. The distributed project management system according to claim 13, wherein said plurality of user dashboards further comprise a lender dashboard.

16. The distributed project management system according to claim 10, wherein said project template comprises a master template and a plurality of slave templates linked by association to the master template.

17. The distributed project management system according to claim 10, wherein said project template comprises actionable task items and partial payment milestones.

* * * * *